United States Patent
Deakin et al.

(10) Patent No.: US 9,632,913 B2
(45) Date of Patent: Apr. 25, 2017

(54) REMOTE DEBUG SERVICE IN A CLOUD ENVIRONMENT

(71) Applicant: INTERNATIONAL BUSINESS MACHINES CORPORATION, Armonk, NY (US)

(72) Inventors: Hannah J. Deakin, Southampton (GB); Sara L. Mitchell, Winchester (GB); Edward J. Slattery, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/418,002

(22) PCT Filed: Jun. 11, 2013

(86) PCT No.: PCT/IB2013/054776
§ 371 (c)(1),
(2) Date: Jan. 28, 2015

(87) PCT Pub. No.: WO2014/020457
PCT Pub. Date: Feb. 6, 2014

(65) Prior Publication Data
US 2015/0193328 A1 Jul. 9, 2015

(30) Foreign Application Priority Data

Jul. 30, 2012 (GB) .................................. 1213532.3

(51) Int. Cl.
*G06F 11/00* (2006.01)
*G06F 11/36* (2006.01)
*G06F 9/455* (2006.01)

(52) U.S. Cl.
CPC ...... *G06F 11/3644* (2013.01); *G06F 9/45558* (2013.01); *G06F 11/362* (2013.01); *G06F 2009/45591* (2013.01)

(58) Field of Classification Search
USPC ....................................................... 714/38.14
See application file for complete search history.

(56) References Cited

U.S. PATENT DOCUMENTS 7,581,211 B2  8/2009  Babineau et al.
7,661,030 B2  2/2010  Bozak et al.
(Continued)

FOREIGN PATENT DOCUMENTS

JP    05-250207 A    9/1993
JP    05-274177 A    10/1993
(Continued)

OTHER PUBLICATIONS

B. Lee et al., "Debug All Your Code: Portable Mixed-Environment Debugging," OOPSLA'09, 2009, pp. 1-19, ACM.
(Continued)

*Primary Examiner* — Sarai Butler
(74) *Attorney, Agent, or Firm* — Law Office of Jim Boice

(57) ABSTRACT

A method provides a debug service in a network environment. One or more processors initiate a debug service as a remote shared service in the network environment. The debug service receives a call from a deployed workload process within a virtual machine in the network environment, and gathers required information for a debug session of the workload process, where the required information includes source code used by the workload process. One or more processors attach the debug service to the workload process to carry out the debug session, such that the debug (Continued)

service working with a debug agent at the workload process attaches to and debugs a virtual environment that obscures the virtual machine.

20 Claims, 11 Drawing Sheets

(56) References Cited

U.S. PATENT DOCUMENTS

| | | | |
|---|---|---|---|
| 7,673,180 | B1 | 3/2010 | Chen et al. |
| 7,752,315 | B2 | 7/2010 | Da Palma et al. |
| 2009/0106739 | A1 | 4/2009 | Weatherbee et al. |
| 2009/0327809 | A1* | 12/2009 | Joy .................... G06F 11/366 714/26 |
| 2011/0145836 | A1* | 6/2011 | Wheeler ................ G06F 9/542 719/314 |
| 2011/0258612 | A1 | 10/2011 | Matthiesen et al. |
| 2011/0258614 | A1 | 10/2011 | Tamm |
| 2011/0295821 | A1 | 12/2011 | Harris |
| 2012/0131555 | A1 | 5/2012 | Hossain et al. |
| 2012/0151452 | A1* | 6/2012 | Zinkovsky ............ G06F 11/362 717/129 |

FOREIGN PATENT DOCUMENTS

| | | |
|---|---|---|
| JP | 2000-293498 A | 10/2000 |
| WO | 2011071624 A2 | 6/2011 |

OTHER PUBLICATIONS

K. Lee et al., "A Design and Implementation of a Remote Debugging Environment for Embedded Internet Software," Language, Compilers, and Tools Lecture Notes in Computer Science, vol. 1985, Jul. 20, 2001, pp. 199-203, Springer Berlin Heidelberg. (Abstract Only).

B. Prince, "Debugging in the Cloud—Using Microsoft Azure Diagnostics", codeguru.com, Apr. 19, 2010, pp. 1-19, QuinStreet Inc.

J. Nakashima, "Using IntelliTrace to Debug Windows Azure Cloud Services", blogs.msdn.com, Jun. 7, 2010, pp. 1-10, Microsoft Corporation.

International Searching Authority, International Application No. PCT/IB2013/054776—International Search Report and Written Opinion mailed Sep. 17, 2013.

P. Mell et al., "The NIST Definition of Cloud Computing", National Institute of Standards and Technology, Information Technology Laboratory, Version 15, Oct. 7, 2009, pp. 1-2.

\* cited by examiner

REMOTE DEBUG SERVICE IN A CLOUD ENVIRONMENT

BACKGROUND

This invention relates to the field of debug services. In particular, the invention relates to a remote debug service in a cloud environment.

Cloud computing is network-based computing in which shared resources, software, and information are provided to computers and other devices on demand. Debugging in the cloud environment is more challenging than in the traditional server world. This is because virtualization in the cloud environment obscures the resources, and an application can be moved around, scaled up or down without any visible sign. Internet Protocol (IP) addresses are also not stable, so connectivity of the debugger to the debuggee is uncertain.

Debuggers tend to have a connection model where the process is either run from the debugger, or the debugger is attached after the process is running—usually killing the process at the end of the debug session. That does not really fit a model where processes are transient, and it is not known up front which one will crash.

Known solutions for troubleshooting within a cloud environment are to collect trace and logs which may be pulled into one central location for analysis. These suffer from the following disadvantages.

The trace has to be so complete as to allow analysis of the problem without real-time decision making, so values of all variables etc. have to be known. This makes the trace very large, and possibly causes performance problems in the deployed system because so much information must be gathered.

The trace is always from many processes/threads and not just the one that caused the problem. Locating the right log is a major task in itself.

The debugging is always post-mortem; there is no possibility to break into the flow, alter variables and continue.

Debugging normally works in the following ways:
1) The process to be debugged is already running and can accept a connection from a debugger. The debugger is run and connects to the process.

Alternatively,
2) The process is started in a special way with the debugger already attached to it.

Neither of these methods of debugging is suitable for cloud deployments, where an unspecified number of processes are running, and the user does not know which process will be the one which is going to fail.

Therefore, there is a need in the art to address the aforementioned problems.

SUMMARY

In an embodiment of the present invention, a method provides a debug service in a network environment. One or more processors initiate a debug service as a remote shared service in the network environment. The debug service receives a call from a deployed workload process within a virtual machine in the network environment, and gathers required information for a debug session of the workload process, where the required information includes source code used by the workload process. One or more processors attach the debug service to the workload process to carry out the debug session, such that the debug service working with a debug agent at the workload process attaches to and debugs a virtualized environment that obscures the virtual machine.

In an embodiment of the present invention, a method uses a debug service in a network environment. One or more processors deploy a workload process within a virtual machine in a network environment, and register with a debug service as a remote shared service in the network environment. One or more processors activate a debug agent to run alongside the workload process, such that the debug service working with the debug agent provides a resource to attach to and debug virtualized environments.

In an embodiment of the present invention, a computer program product utilizes a debug service in a network environment. The computer program product includes a computer readable storage medium having program code embodied therewith. The computer readable storage medium is not a transitory signal per se, and the program code is readable and executable by a processor to perform a method that includes: deploying a workload process within a virtual machine in a network environment; registering with a debug service in the form of a remote shared service in the network environment; and activating a debug agent to run alongside the workload process, such that the debug service working with the debug agent provides a resource to attach to and debug virtualized environments.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

DETAILED DESCRIPTION

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A debugging service for a cloud environment is described as a free-standing debug process in the cloud, which is prepared to take an attachment from any other process. The attachment protocol may be reversed so that any process could, during its shutdown from a protection violation or similar, call out to see if there is a debug as a service (DAAS) process running, and attach to it.

The described debug process may be considered as a cloud white blood cell—waiting to attach to sick processes to collect data and debug.

In one embodiment, a process which is part of a deployed service may recognize that it is in some state which is critical, and may discover that the environment had been configured to be debugged by asking a service locator for a debug service, and being returned a valid service.

Once the service is discovered, the exchange of information takes place such that the problem process identifies itself, its current program location, and its corresponding code version, then it starts a debug agent and waits. The debug service responds by gathering the information required for a debug session, and, when ready, attaches back to the problem process.

In another embodiment, instead of the process reaching a critical point and calling out, there may be provided a user interface or command line interface such that an administrator can tell the process that it needs to be debugged and must start the debug attachment process. On this event, the process acts as though it had reached a critical point as above, and waits to be attached to by a debug service.

The presentation of a debug process as "just another service" makes it conform to the cloud model. The key to implementing this service is that the subscribing processes have to provide support for calling out to the debug process when they are in critical conditions.

Figure 1:
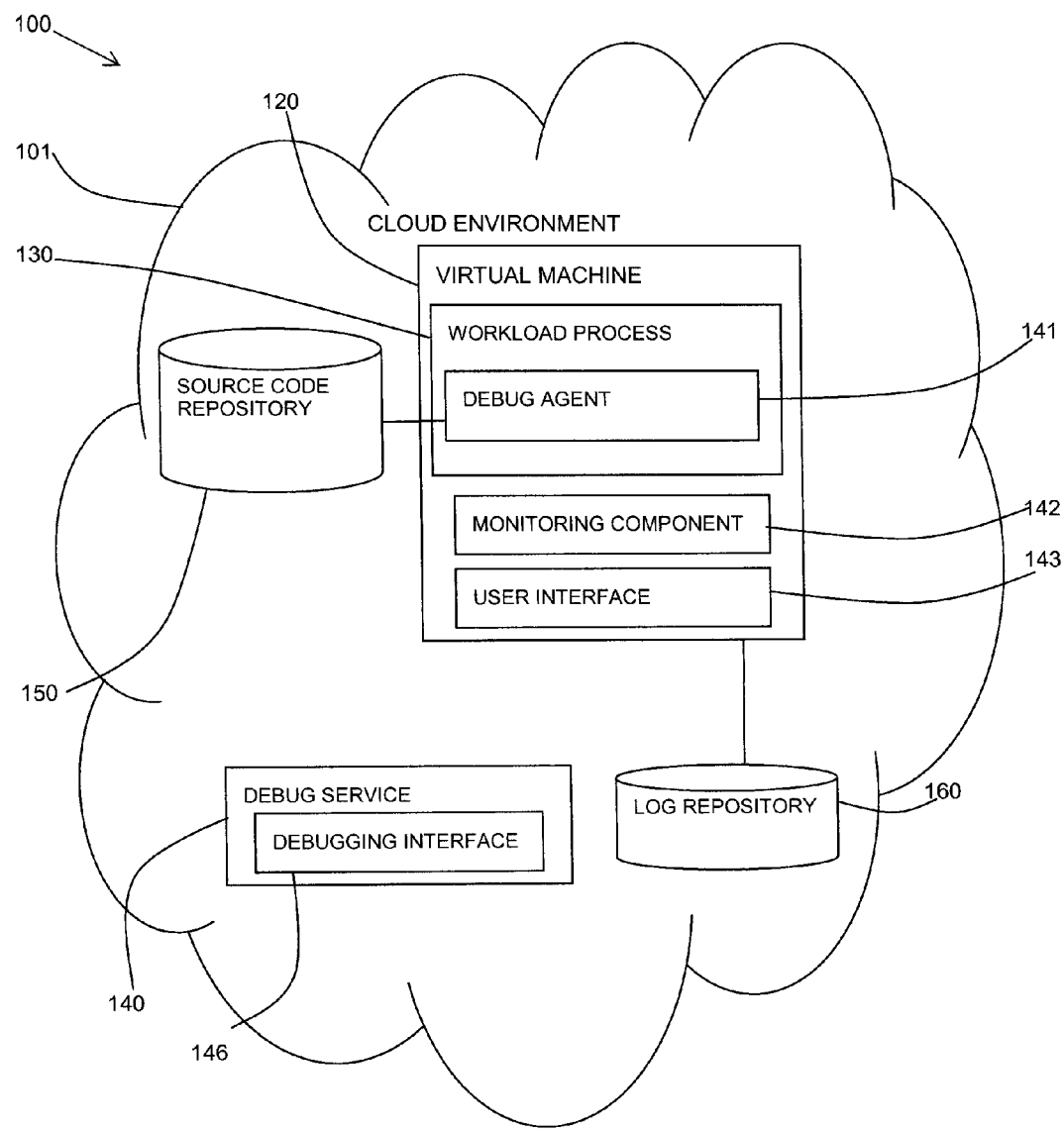
FIG. 1 is block diagram of an example embodiment of a system in accordance with the present invention.

Referring to FIG. 1, a block diagram shows a first embodiment of the described system 100.

In this embodiment, a cloud environment 101 is provided including one or more virtual machines 120. The system includes one or more workload processes 130 running in the one or more virtual machines 120.

A debug service (Debug-as-a-Service (DaaS)) 140 may be provided as a remote service to enable debugging of workload processes 130 running on a virtual machine 120. A workload process 120 may register itself with the debug service 140 and a debug agent 141 may be provided within the workload process 130. The debug service 140 may include a debugging interface 146 for interaction with the debug agent 141.

The debugging interface 146 provided within the debug service 140 may provide a way for a workload process 130 to register with the debug service 140. It is a communication mechanism between the debug service 140 and the debug agent 141 that runs on the workload process 130, and a way for the source code repository 150 to interact with the shared debug service 140.

A workload process 130 may register with a debug service 140 via an agent interface. A debug agent 141 may run on a workload virtual machine 120 alongside the workload process 130 it is registered to.

The debug service 140 working with the debug agent 141 provides a way to attach to and debug virtualized environments that are transient and can be running a broad range of technologies.

For example, the cloud environment 101 and the debug service 140 may be provided using IBM SmartCloud services (IBM and SmartCloud are trade marks of International Business Machines Corporation), IBM PureApplication systems (IBM and PureApplication is a trade mark of International Business Machines Corporation), or other cloud implementation systems.

The debug service 140 may be enabled to run on an entire workload, based on a failure criteria, or as called upon by an administrator.

In one embodiment, the debug agent 141 may include or be connected to a monitoring component 142 for monitoring the workload process 130 for critical events or failure conditions which may trigger the debug service 140. Such critical events may be input or defined by a user of the workload process 130. A debug agent 141 may call out to the debug service 140 when an active deployment reaches a critical status.

As an alternative embodiment, the debug agent 141 may include or be connected to a user interface 143 through which an administrator may inform the workload process 130 that it needs to be debugged and must call out to the debug service 140.

Source code of the workload process 130 may be provided remotely in one or more source code repositories 150. The debug service 140 may access the source code of a workload process 130 during the debug service 140 operation.

A virtual machine 120 may have a log repository 160 for capturing trace data which will persist after a virtual machine failure. The log repository 160 may also be accessed by the debug service 140.

Figure 2:
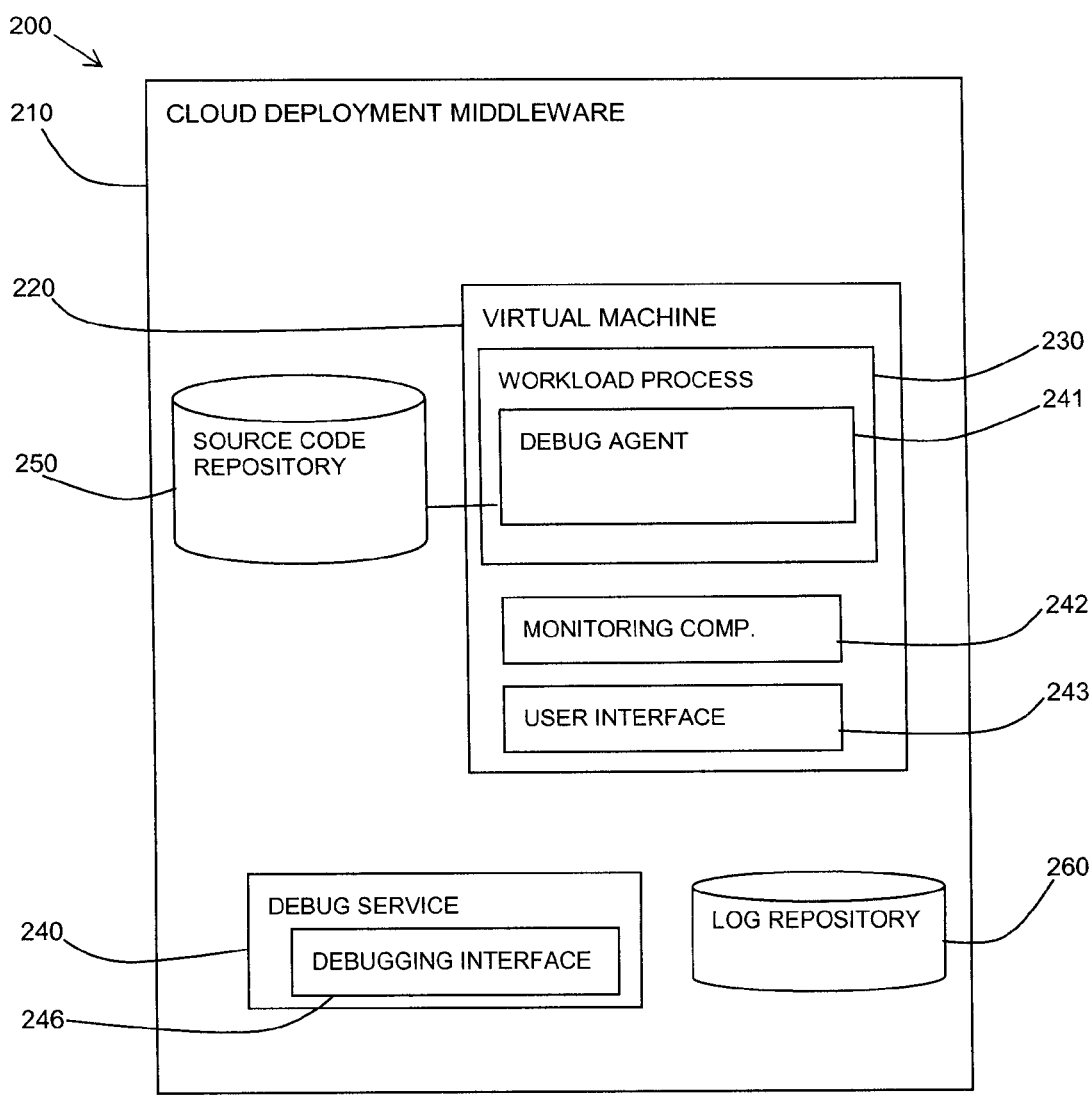
FIG. 2 is block diagram of an example embodiment of a system in accordance with the present invention.

Referring to FIG. 2, a block diagram shows a second embodiment of the described system 200. In this embodiment, cloud deployment middleware 210 is provided. The cloud deployment middleware 210 may provide one or more virtual machines 220 and may deploy a workload process 230 within a virtual machine 220.

Cloud deployment middleware 210 enables adoption and deployment of both Infrastructure as a Service and Platform as a Service offerings, and rapid prototyping of new business applications. The cloud deployment middleware 210 may be positioned directly between the business workloads that many organizations use and the underlying infrastructure and platform components. For example, the cloud deployment middleware 210 may be IBM Workload Deployer with IBM PureApplication systems (IBM and PureApplication is a trade mark of International Business Machines Corporation).

The cloud deployment middleware 210 may run the debug service 240 as a centralized shared service, for example, one instance per cloud group. The debug service 240 is shown in FIG. 2 as running within the cloud deployment middleware 210; however this may run remotely. The debug service 240 may include a debugging interface 246 for interaction with the debug agent 241.

The debug service 240 may be enabled to run on an entire workload, based on a failure criteria, or as called upon by an administrator.

In one embodiment, the debug agent 241 may include or be connected to a monitoring component 242 for monitoring the workload process 230 for critical events or failure conditions which may trigger the debug service 240. Such critical events may be input or defined by a user of the workload process 230.

As an alternative embodiment, the debug agent 241 may include or be connected to a user interface 243 through which an administrator may inform the workload process 230 that it needs to be debugged and must call out to the debug service 240.

Source code of the workload process 230 may be provided remotely in one or more source code repositories 250. The debug service 240 may access the source code of a workload process 130 during the debug service 240 operation.

The cloud deployment middleware 210 may provide a log capture mechanism for a virtual machine 220 with a log repository 260 for capturing trace data which will persist after a virtual machine failure. The log repository 260 may also be accessed by the debug service 240.

The cloud environment may provide a debugging interface for the debug service to be used by an integrated development environment (IDE), for example, such as Rational Team Concert (RTC). This would enable developers to step through source code from a configured breakpoint. This would pre-requisite the ability to attach the active virtual deployment with the source code via the debug service so that the actual virtual deployment may be debugged.

The debug shared service would provide one or several protocols for debugging to integrate with a variety of IDEs. The deployed workload VMs attach to the debug protocol provided so that the source code is then linked to the deployed workload.

When debugging software it is often necessary to identify events or paths that the user wishes to debug. The debug service may be enhanced by providing a way to define "critical" events, by attaching breakpoints within the code that contain additional metadata to act as conditions to determine whether a debug trigger event has occurred.

The definition of "critical" may be enhanced such that a user of the workload may define a particular transaction or event as "critical" temporarily—through configuration or user interface, thus effectively setting a breakpoint in a working system and allowing the debug service to provide live debugging with stepping, variable modification, continuation etc.

In normal debugging scenarios, a debugger is attached to a process which is running a known set of un-optimized code corresponding to the source code available in the debugger. This tight relationship allows the developer to indicate a line of code and have the debugger reliably calculate which instruction corresponds to that line for code and insert the break point.

A deployed application is not generally a single process—it is a collection of collaborating processes which may have been developed in different development environments and with different languages, and therefore require different debug interfaces. For a debug session to be useful over the whole application, the whole application must share the information that it is being debugged, and must check at the boundaries that an appropriate debug interface is connected. This boundary might be an inter-process communication between similar or dissimilar components of the application.

For example, a command started at the user interface might result in a REST (Representational state transfer) method in the kernel being called, which might spawn a new virtual machine, and that virtual machine might start a new process.

Instead of setting a breakpoint on a line of code, a debug session may need to move across different parts of the workload application. Because a given workload may be running several different types of code (i.e. Java (Java and all Java-based trademarks and logos are trademarks or registered trademarks of Oracle and/or its affiliates), Python (Python is a trade mark of Python Software Foundation) etc.), it needs to be able to attach to multiple source code repositories.

To be able to do this, the debug service may dynamically attach to the source code that is running (rather than hitting a previously configured breakpoint).

This is achieved when the debug agent communicates to the debug service when the workload process has reached the boundary of one part of the source code and hands over to the next one. The debug service will then attach the relevant source from the previously configured source code repositories.

The workload process will be enabled for debugging. This will cause the workload process to register with the debug service. As a result a debug agent will be started within the workload process.

The debug agent may include a register of the build numbers that are then used by the debug service to attach the correct version of source code.

There may be a monitoring agent watching for trigger points to be hit. When that occurs then the monitoring agent will notify the debug agent which in turn tells the debug service to begin debugging using the attached source code.

Figure 3:
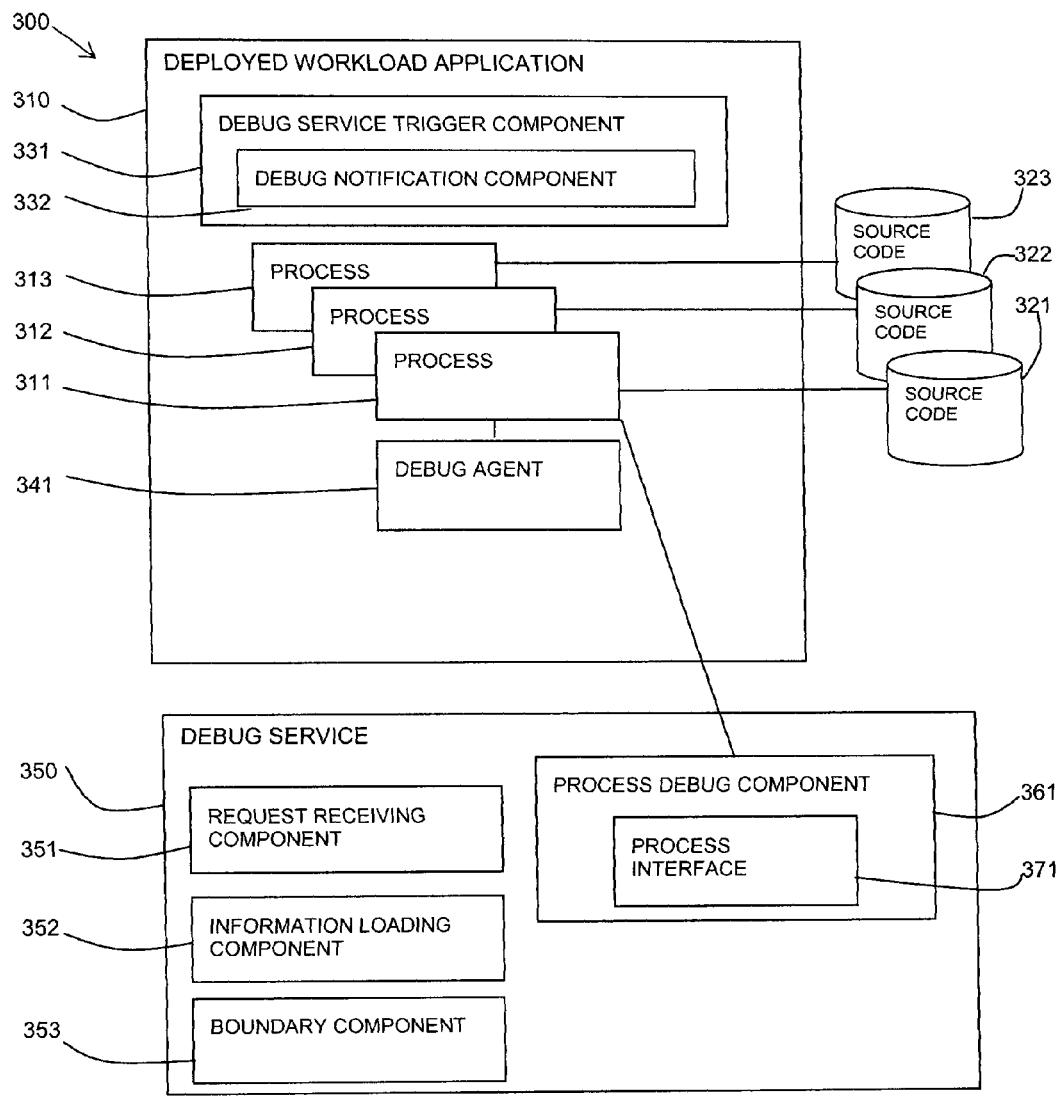
FIG. 3 is a block diagram of an embodiment of an aspect of a system in accordance with the present invention.

Referring to FIG. 3, a block diagram shows an example embodiment of the described system 300.

A deployed workload application 310 may be provided with multiple workload processes 311-313 which each have source code 321-323. The application 310 may include a debug service trigger component 331 which may operate on a critical condition being reached in the application, or may include a user interface so that an administrator may trigger the debug.

The debug service trigger component 331 may include a debug notification component 332 which notifies all the processes 311-313 that debugging is required or underway. One or more of the current processes 311-313 may be paused and activate a debug agent 341 to engage the debug service 350.

The debug service 350 may include a request receiving component 351 for receiving a debug request from a process 311. The debug service 350 may include an information loading component 352 for loading appropriate source code 321 for the process 311 and opening the appropriate debug component 361 for the process 311 with a process interface 371 for interacting with the debug agent 341 of the process 311.

When a boundary between processes 311-313 is reached by the debug service 350, a boundary component 353 may include a user interface to ask whether another process 312 debug component 362 is required or if the user wishes to skip the debugging of the other process 312.

EXAMPLE

The administrator indicates via a command line interface that debugging of an application is required. The application is currently executing some Java code in a service composed of some Python scripts, some Java extensions which use inter-process communication to talk to a database server written in C. All the components are notified that debugging is required—the Java application is paused and a debug service is sought. The debug service responds by loading the appropriate code, and opening a RTC Java debug component, then connecting back to the application. A debug session ensues, in which the debug service steps though code until a database call is reached. On stepping over that code, the database server is called, and this server recognizes that it is in a debug mode as part of the application. The server calls out to debug service for a suitable process debug component and the debug service responds by loading the appropriate code and opening (for example) the Eclipse C/C++ debug component.

A further enhancement would be for the debug service to ask at these boundaries whether the new process debug component is required. In this example, if the user wants to skip debugging the database server, then the debug service connects to the database service and causes it to continue instead of breaking, thus returning control to the Java debugger straight away.

Figure 4:
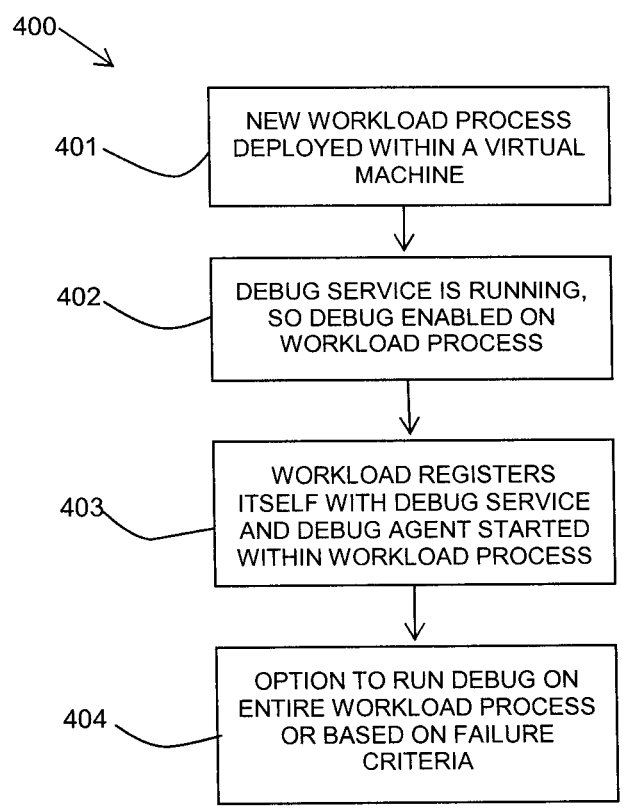
FIG. 4 is a flow diagram of an example embodiment of an aspect of a method in accordance with the present invention.

Referring to FIG. 4, a flow diagram 400 shows an embodiment of an aspect of the described method of enabling and registering with the described debug service. A new workload process may be deployed 401 within a virtual machine. This may be deployed using a cloud deployment middleware as described in FIG. 2, or directly in a cloud environment.

A debug service may be running and debug enabled 402 on the workload process. This may cause the workload to register 403 itself with the debug service and a debug agent started within the workload process.

There may be an option to run 404 the debug on the entire workload process or based on failure criteria of the workload process.

Figure 5A:
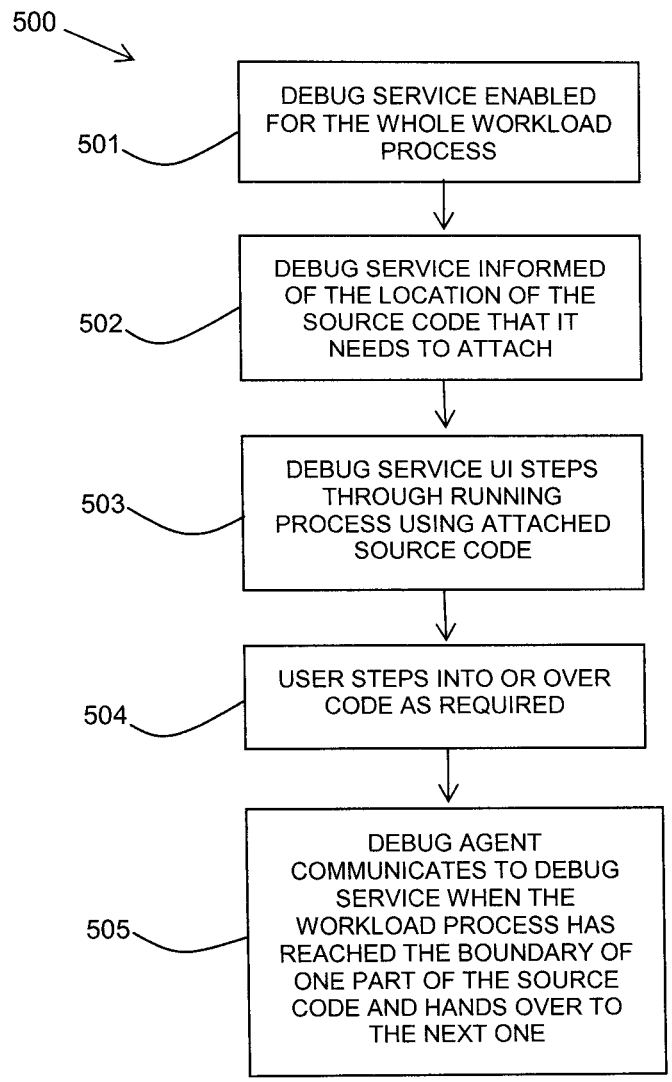
FIGS. 5A and 5B are flow diagrams of example embodiments of aspects of a method in accordance with the present invention.

Referring to FIG. 5A, a flow diagram 500 shows an embodiment of an aspect of the described method wherein the debug service may be enabled 501 for the whole workload process.

The debug service may be informed 502 of the location of the source code that it needs to attach. A user interface of the debug service may step through 503 running the process using the attached source code. A user may step 504 into or over code as required.

As workload process may be running several different types of code, i.e. Java, Python etc., it needs to be able to attach to multiple source code repositories. The debug agent may communicate 505 to the debug service when the workload process has reached the boundary of one part of the source code and hands over to the next one.

Figure 5B:
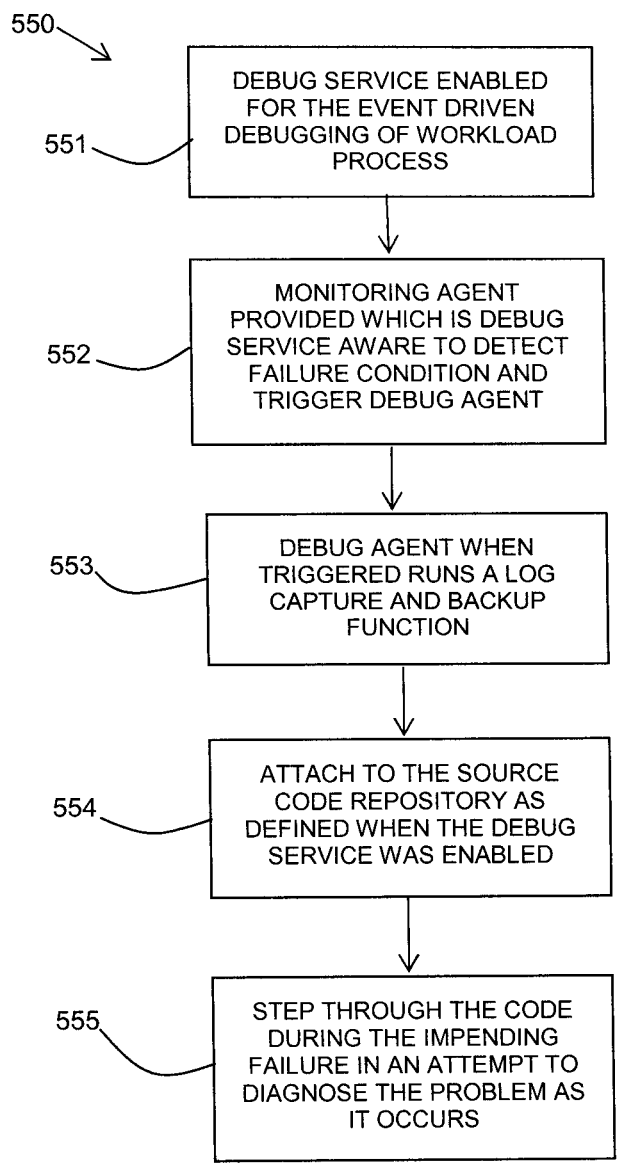

Referring to FIG. 5B, a flow diagram 550 shows an embodiment of an aspect of the described method wherein the debug service may be enabled 551 for event driven debugging of a workload process.

A monitoring agent may be provided 552 which is debug service aware to detect a known failure condition and trigger the debug agent.

The debug agent when triggered may run 553 a log capture and backup function.

The debug service may attach 554 to a source code repository as defined when the debug service was enabled.

The debug service may step 555 through the code during the impending failure in an attempt to diagnose the problem as it occurs.

Figure 6:
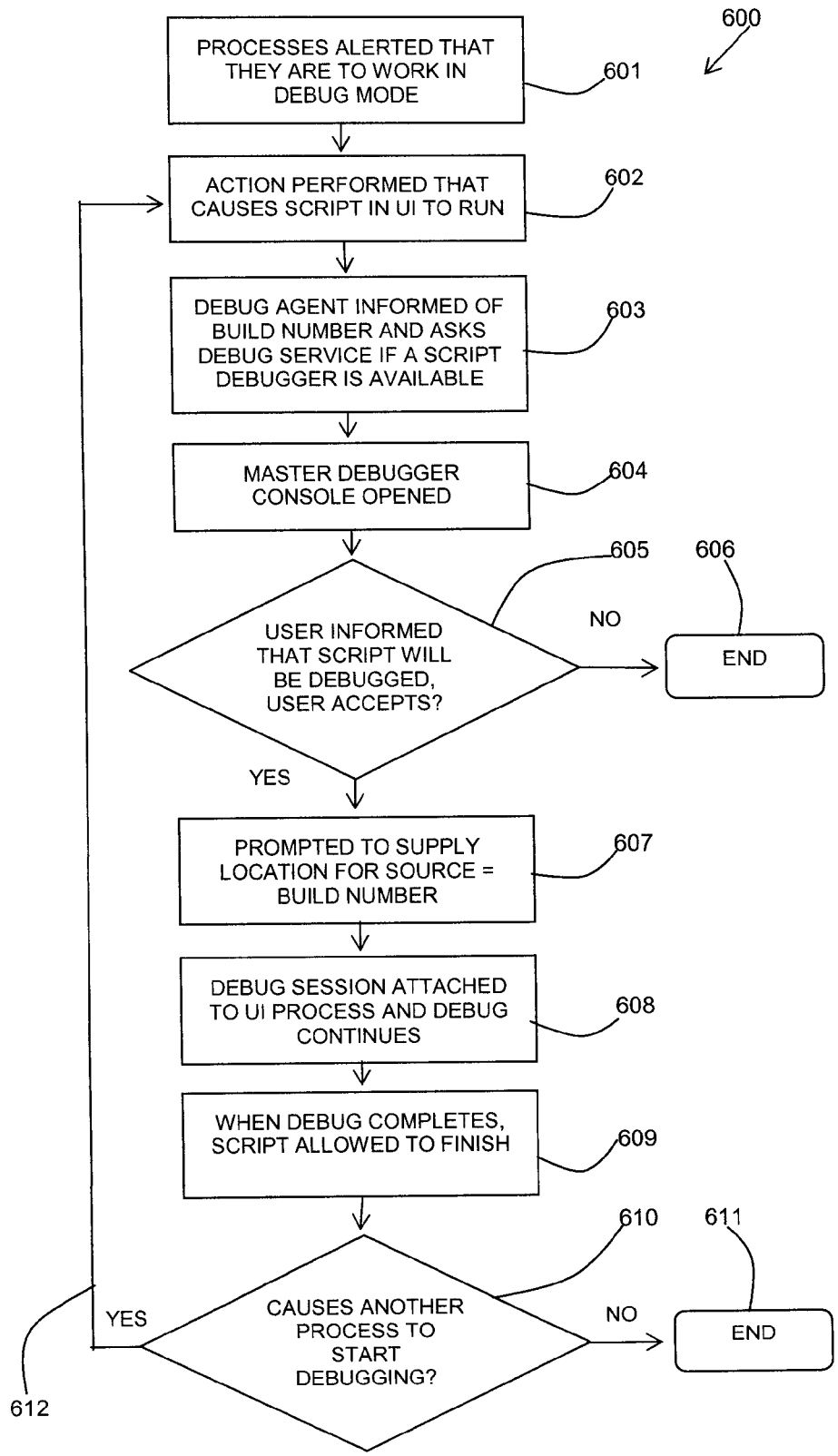
FIG. 6 is a flow diagram of an example embodiment of an aspect of a method in accordance with the present invention.

Referring to FIG. 6, a flow diagram 600 shows an embodiment of an aspect of the described method.

Processes may be alerted 601 that they are to work in debug mode (for example, this may be via the debug service UI to the debug agent).

Some action may be performed 602, and causes a script in the UI to run. The debug agent may be informed 603 of the build number and asks the debug service if a script debugger is available.

A master debugger console may be opened 604 and the user may be informed that a script will be debugged and offered 605 the choice of declining or accepting to debug. If the user does not accept the debug, the debug process may end 606.

If the user accepts to debug, he may then be prompted 607 to supply a location for the source corresponding to the given build number.

A debug session may then attached 608 to the UI process and debugging continues.

When debugging is completed, the script may be allowed 609 to finish. This may cause another process to start 610, for example, such as the kernel debugging of a REST service in Java. If there is no other process to start debugging, the method may end 611. If there is another process to start debugging, then the method may loop 612 to repeat the debugging process.

At each stage, the debug service should offer the choice of declining to debug, declining the individual breakpoint, declining to debug this process in this session, or accepting to debug.

Figure 7:
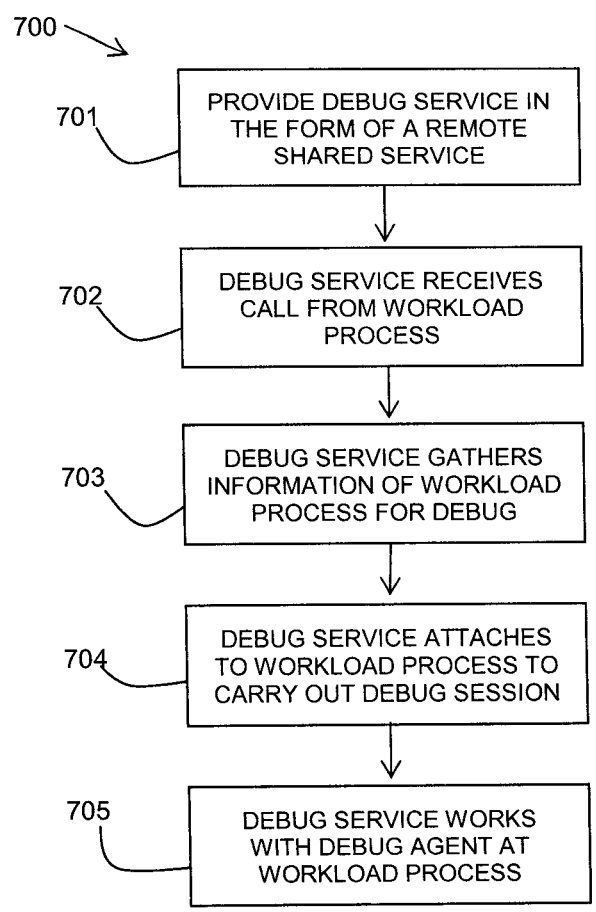
FIG. 7 is a flow diagram of an example embodiment of an aspect of a method in accordance with the present invention.

Referring to FIG. 7, a flow diagram 700 shows an embodiment of the described method at the debug service.

A debug service may be provided 701 in the form of a remote shared service in the network environment. The debug service may receive 702 a call from a deployed workload process within a virtual machine in the network environment.

The debug service may gather 703 required information for a debug session of the workload process including the required source code for the process.

The debug service may attach 704 to the workload process to carry out the debug session. The debug service may work 705 with a debug agent at the workload process to attach to and debug virtualized environments.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
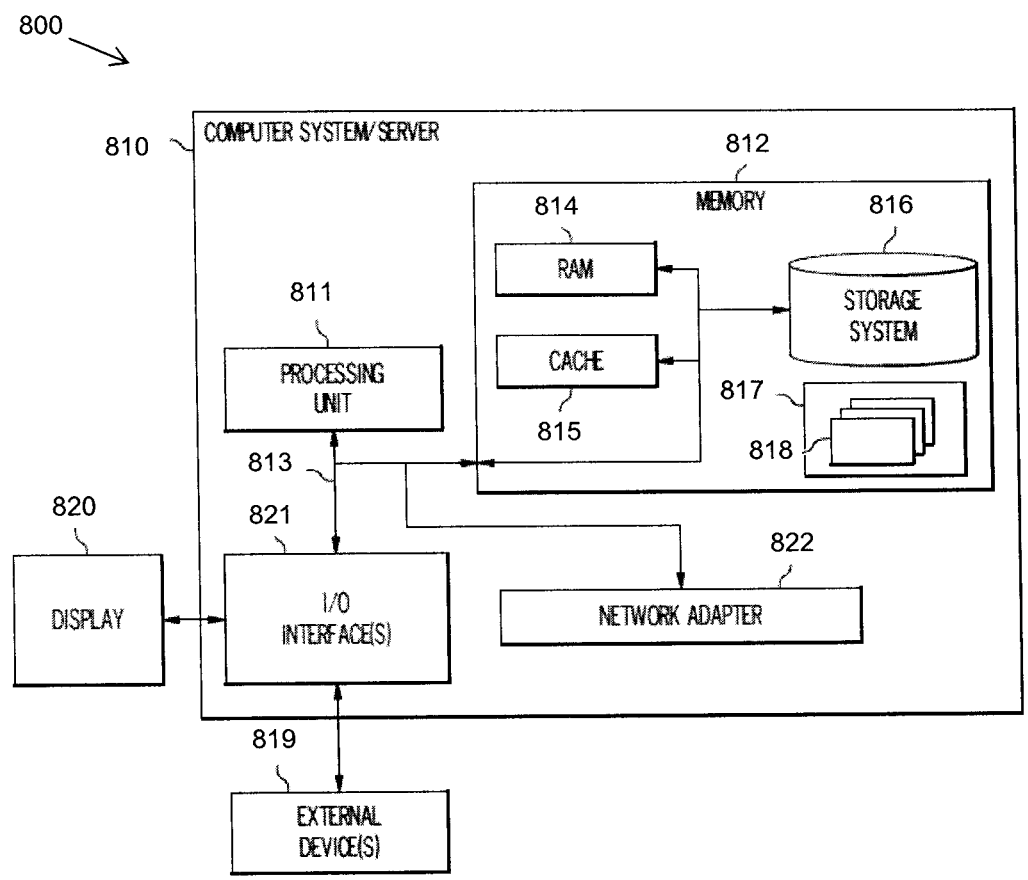
FIG. 8 is a block diagram of a computer system in which the present invention may be implemented.

Referring now to FIG. 8, a schematic of an example of a cloud computing node is shown. Cloud computing node 800 is only one example of a suitable cloud computing node and is not intended to suggest any limitation as to the scope of use or functionality of embodiments of the invention described herein. Regardless, cloud computing node 800 is capable of being implemented and/or performing any of the functionality set forth hereinabove.

In cloud computing node 800 there is a computer system/server 810, which is operational with numerous other general purpose or special purpose computing system environments or configurations. Examples of well-known computing systems, environments, and/or configurations that may be suitable for use with computer system/server 810 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 810 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 810 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 810 in cloud computing node 800 is shown in the form of a general-purpose computing device. The components of computer system/server 810 may include, but are not limited to, one or more processors or processing units 811, a system memory 812, and a bus 813 that couples various system components including system memory 812 to processor 811.

Bus 813 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 810 typically includes a variety of computer system readable media. Such media may be any available media that is accessible by computer system/server 810, and it includes both volatile and non-volatile media, removable and non-removable media.

System memory 812 can include computer system readable media in the form of volatile memory, such as random access memory (RAM) 814 and/or cache memory 815. Computer system/server 810 may further include other removable/non-removable, volatile/non-volatile computer system storage media. By way of example only, storage system 816 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 813 by one or more data media interfaces. As will be further depicted and described below, memory 812 may include at least one program product having a set (e.g., at least one) of program modules that are configured to carry out the functions of embodiments of the invention.

Program/utility 817, having a set (at least one) of program modules 818, may be stored in memory 812 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of embodiments of the invention as described herein.

Computer system/server 810 may also communicate with one or more external devices 819 such as a keyboard, a pointing device, a display 820, etc.; one or more devices that enable a user to interact with computer system/server 810; and/or any devices (e.g., network card, modem, etc.) that enable computer system/server 810 to communicate with one or more other computing devices. Such communication can occur via Input/Output (I/O) interfaces 821. Still yet, computer system/server 810 can communicate with one or more networks such as a local area network (LAN), a general wide area network (WAN), and/or a public network (e.g., the Internet) via network adapter 822. As depicted, network adapter 822 communicates with the other components of computer system/server 810 via bus 813. It should be understood that although not shown, other hardware and/or software components could be used in conjunction with computer system/server 810. Examples, include, but are not limited to: microcode, device drivers, redundant processing units, external disk drive arrays, RAID systems, tape drives, and data archival storage systems, etc.

Figure 9:
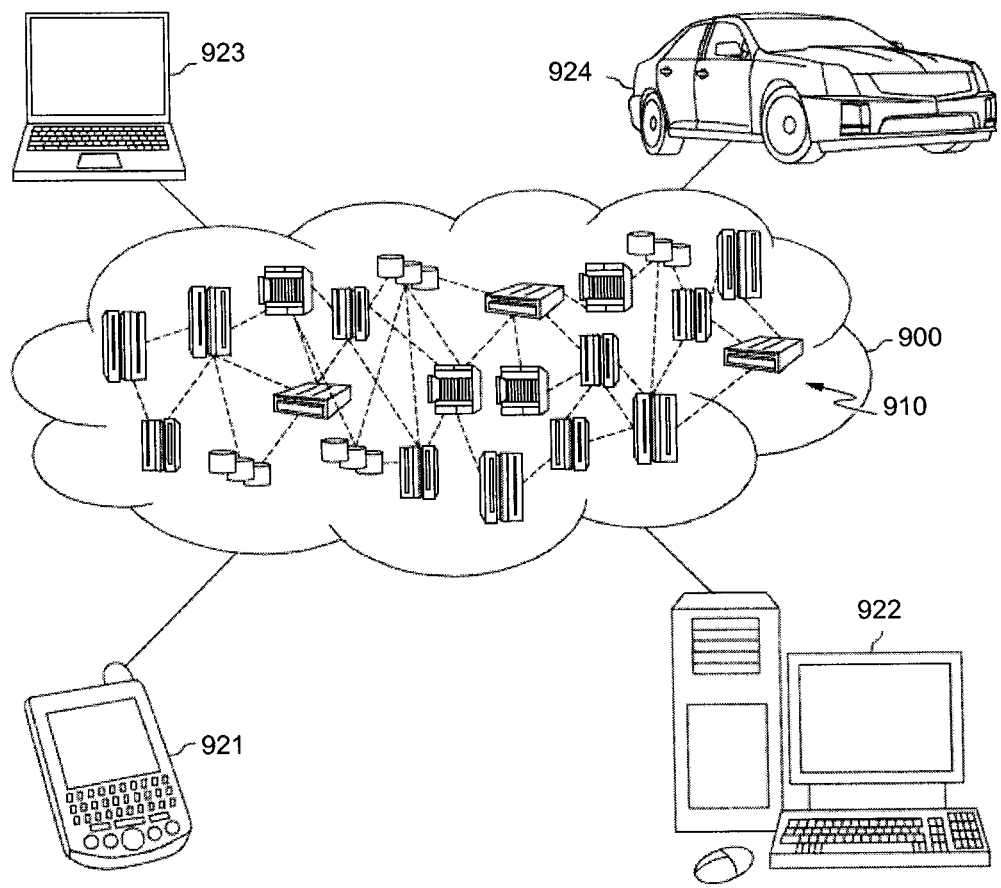
FIG. 9 is a schematic diagram of a cloud computing environment in which the present invention may be implemented.

Referring now to FIG. 9, illustrative cloud computing environment 900 is depicted. As shown, cloud computing environment 900 comprises one or more cloud computing nodes 910 with which local computing devices used by cloud consumers, such as, for example, personal digital assistant (PDA) or cellular telephone 921, desktop computer 922, laptop computer 923, and/or automobile computer system 924 may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 900 to offer infrastructure, platforms and/or software as services for which a cloud consumer does not need to maintain resources on a local computing device. It is understood that the types of computing devices 921-924 are intended to be illustrative only and that computing nodes 910 and cloud computing environment 900 can communicate with any type of computerized device over any type of network and/or network addressable connection (e.g., using a web browser).

Figure 10:
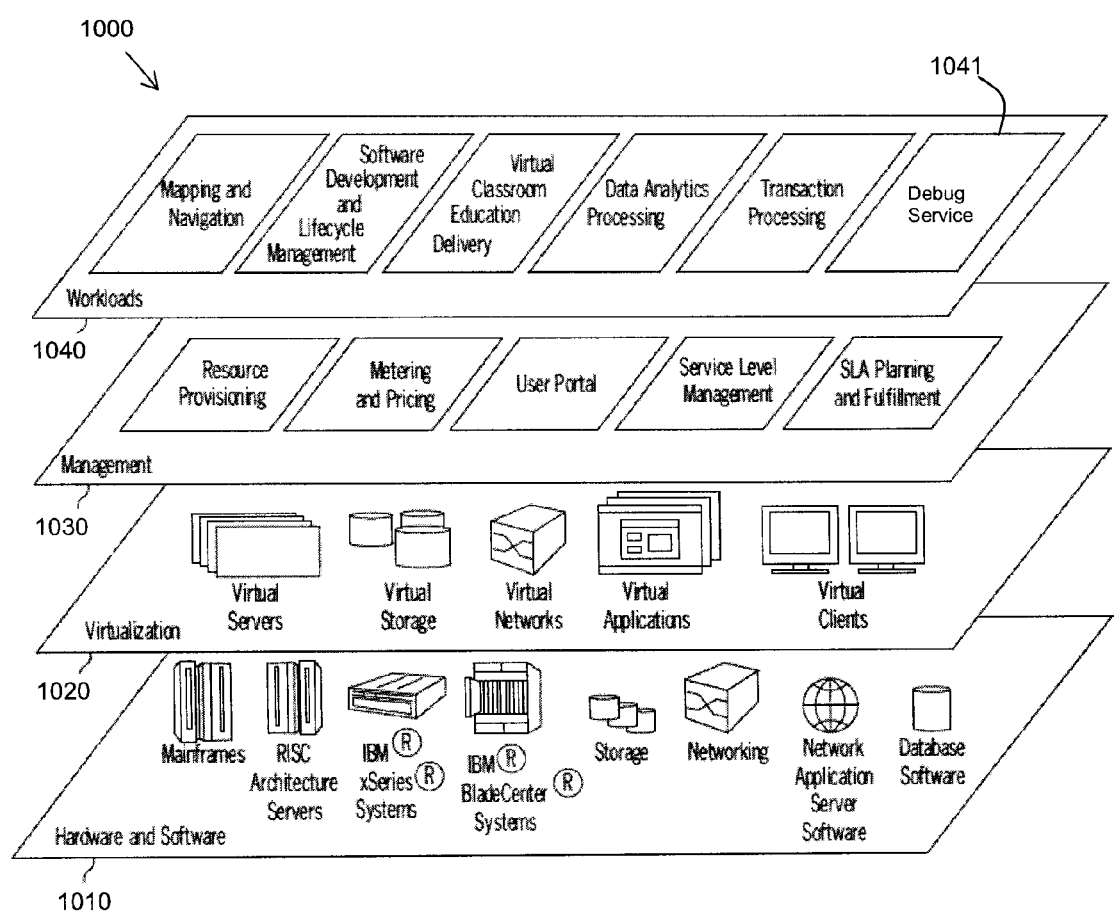
FIG. 10 is a schematic diagram of the layers of a cloud computing environment in which the present invention may be implemented.

Referring now to FIG. 10, a set of functional abstraction layers provided by cloud computing environment 1000 is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1010 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

The hardware and software layer 1010 is where the general servers hosting VMs/TS sessions and graphics servers or GPU providers are located.

Virtualization layer 1020 provides an abstraction layer from which the following examples of virtual entities may be provided: virtual servers; virtual storage; virtual networks, including virtual private networks; virtual applications and operating systems; and virtual clients.

In one example, management layer 1030 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1040 provides examples of functionality for which the cloud computing environment may be utilized. Examples of workloads and functions which may be provided from this layer include: mapping and navigation; software development and lifecycle management; virtual classroom education delivery; data analytics processing; transaction processing; and debugging services 1041.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java and all Java-based trademarks and logos are trademarks or registered trademarks of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

For the avoidance of doubt, the term "comprising", as used herein throughout the description and claims is not to be construed as meaning "consisting only of".

According to a first aspect of the present invention there is provided a method for providing a debug service in a network environment, comprising: providing a debug service in the form of a remote shared service in the network environment; the debug service receiving a call from a deployed workload process within a virtual machine in the network environment; the debug service gathering required information for a debug session of the workload process including the required source code for the process; and the debug service attaching to the workload process to carry out the debug session; wherein the debug service working with a debug agent at the workload process provides a way to attach to and debug virtualized environments.

In one embodiment, the method may include: the debug service receiving a call from a deployed workload process as part of a deployed application with a collaboration of multiple workload processes; receiving communication when the workload process has reached a boundary with another workload process; the debug service gathering required information for a debug session of the next workload process including the required source code for the process. The method may include the debug service asking at a boundary if debugging of the next workload process is required.

The network environment may be a cloud computing environment and the debug service may be provided as a cloud service which accepts connections from workload processes.

According to a second aspect of the present invention there is provided a method for using a debug service in a network environment, comprising: deploying a workload process within a virtual machine in a network environment; registering with a debug service in the form of a remote shared service in the network environment; activating a debug agent to run alongside the workload process; wherein the debug service working with the debug agent provides a way to attach to and debug virtualized environments.

In one embodiment, activating the debug service may be based on failure criteria of the workload process and includes: monitoring a failure condition at the workload process; triggering the debug agent if a failure condition is detected; and the debug agent calling out to the debug service.

In another embodiment, activating the debug service includes: providing a user interface for the workload process; triggering the debug agent via the user interface; and the debug agent calling out to the debug service.

The debug service may be run on the whole workload process or only on part of the workload process.

The method may include providing an option to a user to accept or decline a debug of the or part of the workload process.

The method may include providing access to required information for the debug service to carry out a debug session on the workload process. The method may include providing the debug service with access to remotely stored source code of the workload process. The method may include a workload process providing a build number to a debug agent, such that the exact version of the workload process code can be handed to the debug service.

The method may include: deploying an application in a network environment as a collaboration of multiple workload processes; sharing information across the workload processes that a debug session of the application is underway; checking at boundaries between the workload processes that the debug service has appropriate information for the next workload process.

The method may include indicating to workload processes involved in a transaction that they are about to be debugged, and each external application programming interface of the workload processes informs the debug agent when it is hit, and which debug service is appropriate.

The network environment may be a cloud computing environment and the debug service may be provided as a cloud service which accepts connections from workload processes. The workload process may be deployed by a cloud deployment middleware.

According to a third aspect of the present invention there is provided a system for providing a debugging service in a network environment, comprising: a debug service in the form of a remote shared service in the network environment; the debug service including: a request receiving component for receiving a call from a deployed workload process within a virtual machine in the network environment; an information loading component for gathering required information for a debug session of the workload process including the required source code for the process; and a process debug component for attaching to the workload process to carry out the debug session; wherein the debug service working with a debug agent at the workload process provides a way to attach to and debug virtualized environments.

In one embodiment, a deployed workload process may be part of a deployed application with a collaboration of multiple workload processes; a boundary component for receiving communication when the workload process has reached a boundary with another workload process; and wherein the information loading component is for gathering required information for a debug session of the next workload process including the required source code for the process.

The network environment may be a cloud computing environment and the debug service is provided as a cloud service which accepts connections from workload processes.

According to a fourth aspect of the present invention there is provided a system for using a debug service in a network environment, comprising: a workload process deployed within a virtual machine in a network environment; a registering component for registering with a debug service in the form of a remote shared service in the network environment; a debug agent for activating to run alongside the workload process; wherein the debug service working with the debug agent provides a way to attach to and debug virtualized environments.

In one embodiment, a debug service trigger component may include a monitoring component for monitoring a failure condition at the workload process.

In another embodiment, a debug service trigger component may include a user interface for the workload process for triggering the debug service by a user via the user interface.

The system may include: an application in a network environment in the form of a collaboration of multiple workload processes; a debug notification component for sharing information across the workload processes that a debug session of the application is underway and checking at boundaries between the workload processes that the debug service has appropriate information for the next workload process.

The network environment may be a cloud computing environment and the debug service may be provided as a cloud service which accepts connections from workload processes. The workload process may be deployed by a cloud deployment middleware.

According to a fifth aspect of the present invention there is provided a computer program product for providing a debug service in a network environment, the computer program product comprising a computer readable storage medium having computer-readable program code embodied therewith, the computer-readable program code configured to: receive a call from a deployed workload process within a virtual machine in the network environment; gather required information for a debug session of the workload process including the required source code for the process; and attach to the workload process to carry out the debug session; wherein the debug service working with a debug agent at the workload process provides a way to attach to and debug virtualized environments.

According to a sixth aspect of the present invention there is provided a computer program product for using a debug service in a network environment, the computer program product comprising a computer readable storage medium having computer-readable program code embodied therewith, the computer-readable program code configures to: deploy a workload process within a virtual machine in a network environment; register with a debug service in the form of a remote shared service in the network environment; activate a debug agent to run alongside the workload process; wherein the debug service working with the debug agent provides a way to attach to and debug virtualized environments.

Viewed from a further aspect, the present invention provides a computer program product for providing a debug service in a network environment, the computer program product comprising: a computer readable storage medium readable by a processing circuit and storing instructions for execution by the processing circuit for performing a method for performing the steps of the invention.

Viewed from a further aspect, the present invention provides a computer program product for using a debug service in a network environment, the computer program product comprising: a computer readable storage medium readable by a processing circuit and storing instructions for execution by the processing circuit for performing a method for performing the steps of the invention.

Viewed from a further aspect, the present invention provides a computer program stored on a computer readable medium and loadable into the internal memory of a digital computer, comprising software code portions, when said program is run on a computer, for performing the steps of the invention.

The described aspects of the invention provide the advantage of providing debugging as a service which may be applied in a cloud environment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for providing a debug service in a network environment, the method comprising:
   initiating, by one or more processors, a debug service as a remote shared service in the network environment, wherein the debug service provides a debugger that is capable of accepting connections from any workload process such that collaborating cloud processes are responsible for initiating conversations with the debugger;
   receiving, by the debug service, a call from a deployed workload process within a virtual machine in the network environment, wherein the call is to a debug process to be performed by the debug service;
   gathering, by the debug service, required information by the debug process for a debug session of the workload process, wherein the required information comprises source code used by the workload process; and
   attaching, by one or more processors, the debug service to the workload process to carry out the debug session; wherein the debug service working with a debug agent at the workload process attaches to and debugs a virtualized environment that obscures the virtual machine.

2. The method as claimed in claim 1, further comprising:
   receiving, by the debug service, a call from a deployed workload process as part of a deployed application with a collaboration of multiple workload processes, wherein the collaboration of multiple workload processes comprises a first workload process and a second workload process, wherein the first workload process is debugged by a first debug process and the second workload is debugged by a second debug process, and wherein the first workload process and the second workload process are written in different languages;
   debugging, by the debug service, the first workload process with the first debug process;
   receiving, by the debug service, a communication indicating that the first workload process has reached a boundary with the second workload process;
   gathering, by the debug service, required information for the second debug process to debug the second workload process; and
   debugging, by the debug service, the second workload processes using the second debug process, wherein the debug service transitions from the first debug process to the second debug process without a breakpoint being set between the first workload process and the second workload process.

3. The method as claimed in claim 2, further comprising:
   asking, by the debug service, at a boundary if debugging of the next workload process is required.

4. The method as claimed in claim 1, wherein the network environment is a cloud computing environment, and wherein the debug service is provided as a cloud service that accepts connections from workload processes.

5. A method for using a debug service in a network environment, the method comprising:
   deploying, by one or more processors, a workload process within a virtual machine in a network environment;
   registering, by one or more processors, with a debug service as a remote shared service in the network environment; and
   activating, by one or more processors, a debug agent to run alongside the workload process in response to a call from the workload process to the debug service to activate the debug agent,
   wherein the debug service working with the debug agent provides a resource to attach to and debug virtualized environments.

6. The method as claimed in claim 5, wherein activating the debug service is based on failure criteria of the workload process and includes:
   monitoring, by one or more processors, a failure condition at the workload process;
   triggering, by one or more processors, the debug agent if a failure condition is detected; and
   the debug agent calling out to the debug service.

7. The method as claimed in claim 5, wherein activating the debug service includes:
   providing the debug agent a user interface for the workload process;
   triggering the debug agent via the user interface; and
   the debug agent calling out to the debug service.

8. The method as claimed in claim 5, wherein the debug service is run on the whole workload process.

9. The method as claimed in claim 5, further comprising:
   providing an option to a user to accept or decline a debug of some or all of the workload process.

10. The method as claimed in claim 5, further comprising:
    providing access to required information for the debug service to carry out a debug session on the workload process.

11. The method as claimed in claim 5, further comprising:
providing, by one or more processors, the debug service with access to remotely stored source code of the workload process.

12. The method as claimed in claim 5, further comprising:
a workload process providing a build number to a debug agent, such that an exact version of workload process code can be handed to the debug service.

13. The method as claimed in claim 5, further comprising:
deploying an application in a network environment as a collaboration of multiple workload processes;
sharing information across the multiple workload processes indicating that a debug session of the application is underway; and
checking at boundaries between the multiple workload processes that the debug service has an appropriate debug component for a next workload process, wherein the appropriate debug component is debugging code used to debug the next workload process.

14. The method as claimed in claim 5, further comprising:
indicating to workload processes involved in a transaction that they are about to be debugged, wherein each external application programming interface of the workload processes informs the debug agent when it is hit, and wherein each external application programming interface of the workload processes informs the debug agent which debug service is appropriate for the application that is about to be debugged.

15. The method as claimed in claim 5, wherein the network environment is a cloud computing environment, and wherein the debug service is provided as a cloud service that accepts connections from workload processes.

16. The method as claimed in claim 5, wherein the workload process is deployed by a cloud deployment middleware.

17. A computer program product for utilizing a debug service in a network environment, the computer program product comprising a non-transitory computer readable storage medium having program code embodied therewith, wherein the computer readable storage medium is not a transitory signal per se, and wherein the program code is readable and executable by a processor to perform a method comprising:
deploying a workload process within a virtual machine in a network environment;
registering with a debug service in the form of a remote shared service in the network environment; and
activating a debug agent to run alongside the workload process in response to a call from the workload process to the debug service to activate the debug agent,
wherein the debug service working with the debug agent provides a resource to attach to and debug virtualized environments.

18. The computer program product of claim 17, wherein activating the debug service is based on failure criteria of the workload process, and wherein the method further comprises:
monitoring a failure condition at the workload process;
triggering the debug agent if a failure condition is detected; and
the debug agent calling out to the debug service.

19. The computer program product of claim 17, wherein the method further comprises:
a workload process providing a build number to a debug agent, such that the exact version of the workload process code can be handed to the debug service.

20. The computer program product of claim 17, wherein the method further comprises:
deploying an application in a network environment as a collaboration of multiple workload processes;
sharing information across the workload processes that a debug session of the application is underway; and
checking at boundaries between the workload processes that the debug service has appropriate information for the next workload process.

* * * * *